April 22, 1930.  F. B. PFEIFFER  1,755,933
MACHINE FOR FOLDING TIRE BANDS
Filed June 18, 1929    2 Sheets-Sheet 1

Inventor
Fred B. Pfeiffer
By Robert M. Pierson
Atty.

April 22, 1930. F. B. PFEIFFER 1,755,933
MACHINE FOR FOLDING TIRE BANDS
Filed June 18, 1929 2 Sheets-Sheet 2

Inventor
Fred B. Pfeiffer
By Robert M Pierson
Atty.

Patented Apr. 22, 1930

1,755,933

UNITED STATES PATENT OFFICE

FRED B. PFEIFFER, OF AKRON, OHIO, ASSIGNOR TO SEIBERLING RUBBER COMPANY, OF BARBERTON, OHIO. A CORPORATION OF DELAWARE

MACHINE FOR FOLDING TIRE BANDS

Application filed June 18, 1929. Serial No. 371,897.

This invention relates to band-folding apparatus and particularly to means for folding or doubling one portion of a wide band or tube of flexible material over upon another portion, as in making a pneumatic inner tube, a bead flipper or a flat or semi-flat pneumatic tire band.

The object of my invention is to provide a simple and quick-acting mechanism for performing this operation, preferably in a positive manner, as well as a novel method of performing it.

Of the accompanying drawings, Fig. 1 is a side elevation, partly in section, showing a band-folding machine or apparatus structure in accordance with my invention, as applied to the making of a pneumatic tire band, the folding means being shown in its retracted position.

Figure 1:
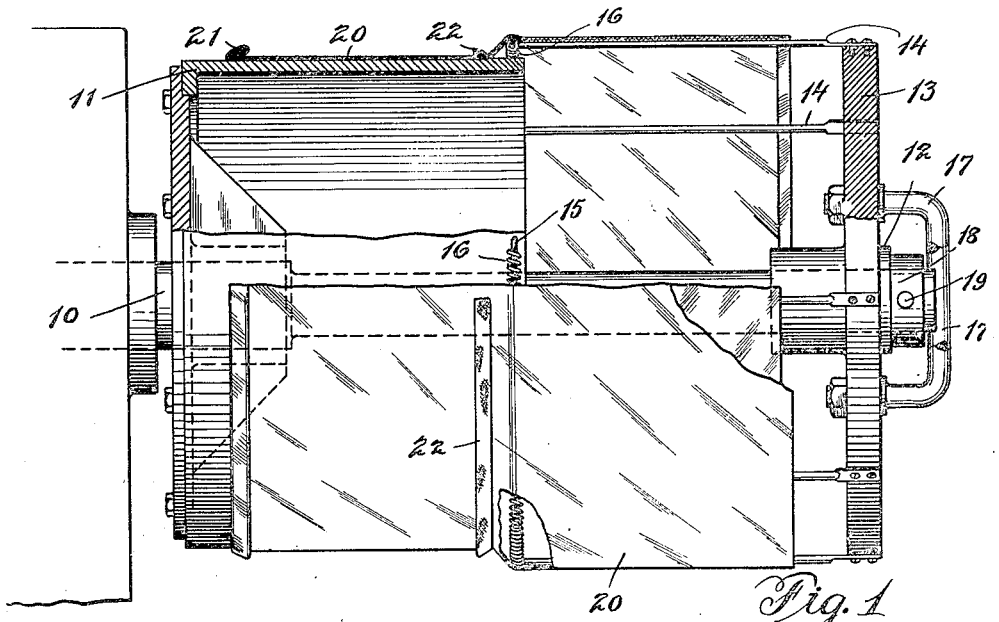

Referring to the drawings, 10 is the rotary shaft of the band-building machine and 11 is a cylindrical drum fixed thereto. On the outer portion of said shaft is slidably mounted the hub 12 of a supporting disk 13, to the periphery of which are attached at equal intervals the outer ends of a series of spring-arms 14 embracing and movable longitudinally over the drum when the disk 13 is pushed inwardly. The inner end portions of these arms are T-shaped and formed with journals 15 on which are mounted a number of helical-spring rollers 16, arranged end-to-end in a circular series and collectively constituting a flexible roller structure which is expansible as a whole by reason of the flexibility of the arms 14 and the separation of the journals in adjacent arms. Any other suitable flexible roller structure could be substituted for the helical-wire devices here disclosed.

The disk 13 is provided with a pair of handles 17 for pushing it in and drawing it outwardly, and the shaft 10 is provided near its outer end with a removable stop collar 18 secured thereto by a lock-pin 19 which may be withdrawn for the purpose of detaching the collar 18 and permitting the disk 13, together with its arms and the roller structure, to be removed from the shaft when the finished tire band is to be withdrawn. This removability of the roller structure, while provided as a convenience for removal of the finished work in the particular embodiment shown, is not essential in a broad sense, for the positions of the drum and the roller disk on the shaft 10 might be reversed so that the roller structure would work outwardly to perform the folding, instead of inwardly, or the parts might be otherwise arranged to allow the roller structure to remain permanently in the machine. Obviously also the roller structure and associated parts might be duplicated at the other end of the drum so as to fold two end portions of a wide band over upon the middle portion.

In the operation of this device, assuming that a clincher tire-forming band is to be made, a strip 20 of rubberized tire fabric, preferably of 2-ply construction with cords lying diagonally in opposite directions in the two plies and with the edges of the plies stepped to taper them properly in one of the beads and of a width double that of the tire band to be formed or slightly more than double, is wrapped around the drum 11 (first one ply and then the other) and the ends of the plies are separately spliced to form an endless band. The right-hand portion of this laminated band extends over the roller structure 16 and over the arms 14 as represented in Fig. 1.

Figure 2:
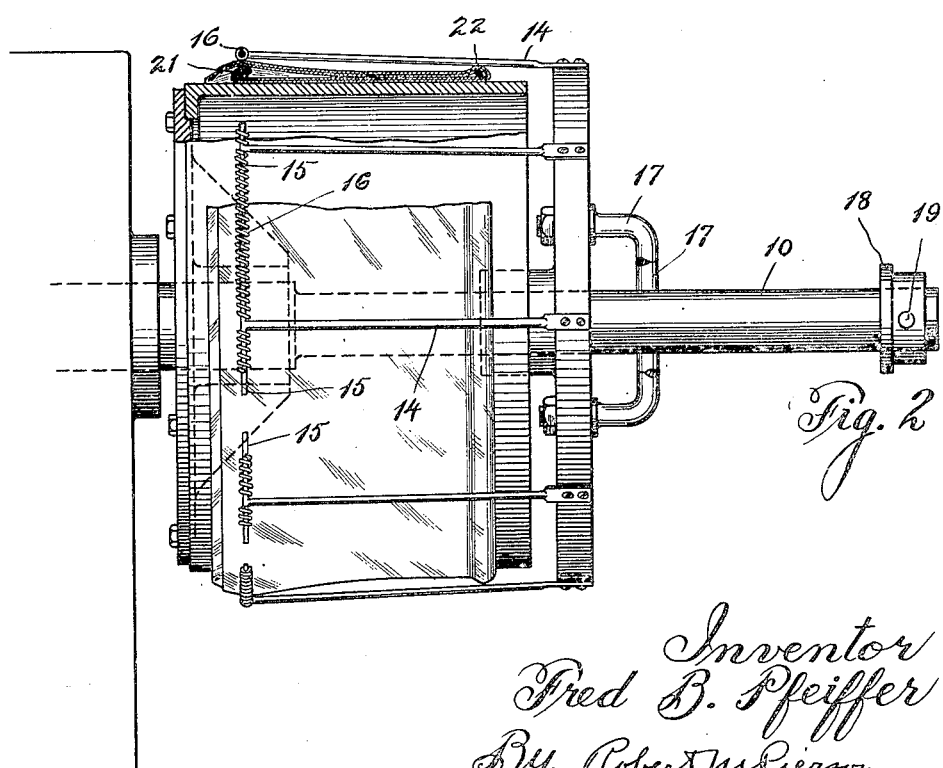
Fig. 2 is a similar view showing the folding means projected after performing the doubling or folding operation.
Figure 3:
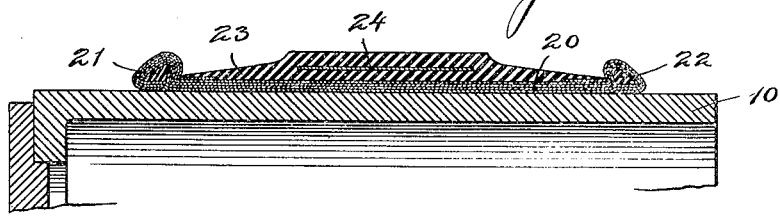
Fig. 3 is a section on a larger scale showing a part of the drum with a completed tire band thereon.
Figure 4:
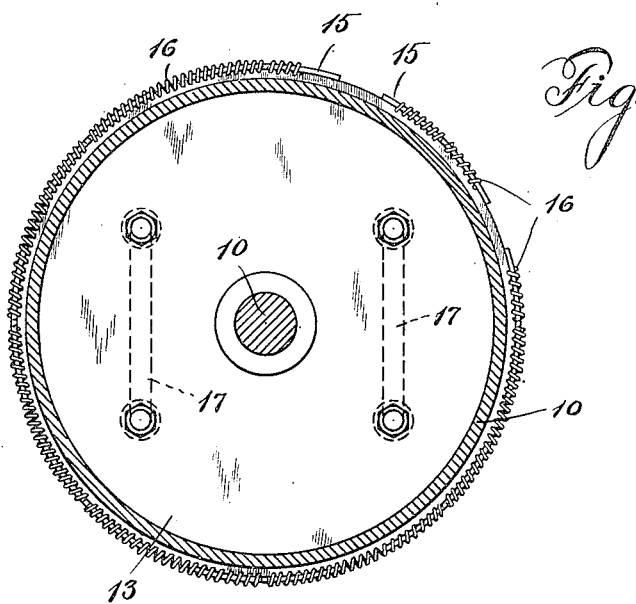
Fig. 4 is a cross-sectional view of the drum, looking toward the outer end thereof and showing the flexible roller structure.

The left-hand bead core 21 is then laid over the carcass band 20 and the right-hand bead core 22 is laid over said carcass band at a distance from the first bead core approximating the width of the tire band to be formed. By grasping the handles 17 and pushing the disk 13 inwardly, the operator then causes the wire roller segments 16 progressively and positively to fold or double the right-hand portion of the band 20 over upon the left-hand portion, the adhesion of the underlying or stationary portion to the drum, plus the presence of the right-hand bead core 22 effectively anchoring said underlying portion. The right-hand bead core is first covered over or enclosed by the advancing band material, then the intermediate underlying material is covered and finally the left-hand bead core at the completion of the folding or doubling movement as indicated in Fig. 2, after which the disk, arm and roller structure is withdrawn and the adhesion of the overlying and underlying portions may be perfected by a stitching or rolling action during rotation of the drum. A tread and side-rubber strip 23 with a breaker strip 24 incorporated therein may then be applied to the carcass band and its ends joined in a butt seam and the band rolled down before removal from the drum as is customary in flat-band tire building, whereupon the completed tire band is removed from the drum after removing the collar 18 and withdrawing disk 13 and its attachments from the shaft 10. The completed band is then formed in tire shape by the vacuum method or other well-known means and the casing vulcanized in a mold.

In forming a pneumatic tube out of plain sheet ribber, of course there are no bead cores, and in flippering a bead there is only one core. The invention may also be applied to the folding of semi-flat carcass bands, where inextensible bead cores are laid over carcass plies against inclined shoulders on the ends of the drum, in accordance with a well-known modification of the flat-band process.

This invention saves the labor cost of cutting bands of approximately the width of the band to be formed, as compared with cutting them in a multiple of that width, and it provides a better locking of that bead core or those cores between the folds of carcass material where a tire band is being produced. The progressive endwise folding of the material can also be performed in somewhat less time than it takes to wrap the outer plies properly upon the under ones in the old method.

I believe the method herein disclosed to be novel irrespective of the apparatus, although the two are closely related as different expressions of a broad idea of means. The details of the apparatus can also be rather widely varied without departing from its essential features, considered as a mechanism.

I claim:

1. In apparatus for folding bands, the combination of a band-supporting drum, and a circularly-disposed flexible roller structure movable over said drum to fold the band material upon itself.

2. In a band-folding machine, the combination of a drum, and a helical-spring roller structure movable over said drum to fold the material.

3. Band folding apparatus comprising a drum, and a structure movable thereover and comprising a series of flexible rollers arranged end-to-end in a circle.

4. Band-folding apparatus comprising a drum, a slidable support coaxial therewith, a series of arms projecting from said support to embrace the drum, and a roller structure carried by said arms and movable longitudinally over the drum.

5. Band-folding apparatus comprising a rotary shaft, a drum carried thereby, a support axially slidable on said shaft, a series of arms mounted on said support and movable longitudinally over the drum, and a flexible roller structure carried by said arms.

6. Band-folding apparatus comprising a drum, and a circularly arranged, flexible, expansible roller structure movable over said drum.

7. Band-folding apparatus comprising a drum, a series of arms movable over said drum and having roller journals, and a flexible roller structure supported by said journals.

8. Band-folding apparatus comprising a drum, a series of flexible arms movable longitudinally over said drum and having roller journals, and a series of helical-wire rollers embracing said journals and arranged end-to-end in a circle.

In witness whereof, I have hereunto set my hand this 15th day of June, 1929.

FRED B. PFEIFFER.